(12) United States Patent
Wang et al.

(10) Patent No.: US 8,863,309 B2
(45) Date of Patent: Oct. 14, 2014

(54) SELECTIVELY UNLOCKING A CORE ROOT OF TRUST FOR MEASUREMENT (CRTM)

(75) Inventors: Lan Wang, Houston, TX (US); David J. DeLisle, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1320 days.

(21) Appl. No.: 11/412,500

(22) Filed: Apr. 27, 2006

(65) Prior Publication Data

US 2007/0260866 A1 Nov. 8, 2007

(51) Int. Cl.
*G06F 21/00* (2013.01)
*G06F 21/57* (2013.01)
(52) U.S. Cl.
CPC .............. *G06F 21/57* (2013.01); *G06F 21/572* (2013.01)
USPC .................................................. 726/30; 713/2
(58) Field of Classification Search
USPC ............................. 713/1–2; 726/16, 21, 26–30
See application file for complete search history.

(56) References Cited

U.S. PATENT DOCUMENTS

| | | | | |
|---|---|---|---|---|
| 5,349,642 A | * | 9/1994 | Kingdon ........................ | 713/161 |
| 6,009,524 A | * | 12/1999 | Olarig et al. .................... | 726/10 |
| 7,293,169 B1 | * | 11/2007 | Righi et al. ....................... | 713/2 |
| 2002/0120845 A1 | | 8/2002 | Cromer et al. | |
| 2003/0208338 A1 | * | 11/2003 | Challener et al. ............. | 702/186 |
| 2004/0003265 A1 | * | 1/2004 | Freeman et al. .............. | 713/191 |
| 2005/0021968 A1 | | 1/2005 | Zimmer et al. | |
| 2005/0132177 A1 | * | 6/2005 | Challener et al. ................. | 713/1 |
| 2005/0132186 A1 | * | 6/2005 | Khan et al. ..................... | 713/165 |
| 2006/0010326 A1 | | 1/2006 | Bade et al. | |
| 2006/0107054 A1 | | 5/2006 | Young | |

OTHER PUBLICATIONS

Microsoft, "Microsoft® Computer Dictionary, Fifth Edition" Microsoft Press, pp. 523 and 578.*
Menezes et al, Handbook of applied cryptography, 1997, CRC Press, pp. 1-3 of attached document.*
H. Maruyama et al., "Linux with TCPA Intergrity Measurement," Research Report, Jan. 28, 2003, IBM Japan, Ltd., pp. 1-6.
"Trusted Mobile Platform," Hardware Architecture Description, Oct. 27, 2004, Intel Corporation, IBM, pp. 1-63.
PCT Search Report dated Jul. 24, 2007; PCT App. No. PCT/US2007/002874, filed Feb. 1, 2007, 13 p.
Office Action dated Jan. 8, 2010 pp. 5.
European Patent Office, Summons to attend oral proceedings pursuant to Rule 115(1) EPC, Application No. 07749803.8, date of mailing Sep. 27, 2011, 5 p.
"The Current Research and Problems of the Trusted Computation", Computer and Information Technology, vol. 13 No. 3, Jun. 2005, 4 p.
State Intellectual Property Office, P.R. China, 2nd Office Action, Appln No. 200780014993.6, date of mailing Jun. 9, 2011, 5 p.
Translation of State Intellectual Property Office, P.R. China, 2nd Office Action, Appln No. 200780014992.6, date of mailing Jun. 9, 2011, 8 p.
European Patent Office, Decision to Refuse a European Patent Application, Application No. 07749803.8, date of mailing Feb. 27, 2012, 10 p.
European Patent Office, Communication pursuant to Article 94(3) EPC dated Jun. 30, 2010, pp. 3.

* cited by examiner

*Primary Examiner* — Kambiz Zand
*Assistant Examiner* — Michael Guirguis

(57) ABSTRACT

A computer system is provided that comprises a processor and a Basic Input/Output System (BIOS) module coupled to the processor. The BIOS module stores a Core Root of Trust for Measurement (CRTM), wherein the CRTM selectively unlocks itself.

21 Claims, 3 Drawing Sheets

SELECTIVELY UNLOCKING A CORE ROOT OF TRUST FOR MEASUREMENT (CRTM)

BACKGROUND

The Trusted Computing Group (TCG) has defined hardware and software components to establish secure or "trusted" computing environments. One hardware/firmware component defined by TCG is the platform Root of Trust (ROT). The platform ROT identifies secure storage options for the Core Root of Trust for Measurement (CRTM). The CRTM specifies predefined policies and performs platform integrity measurements. The platform integrity measurements may include measuring system level metrics or conducting an integrity test for the intended user of a device. Due to the importance of the CRTM in establishing a trusted computing environment, TCG suggests the CRTM must be immutable (i.e., unchangeable). If part or all of a device's Basic Input/Output System (BIOS) is used as the CRTM, a conflict arises in that updating the BIOS is sometimes desirable or even necessary. Current BIOS flash methods rely on application level flash utilities that enable hackers and/or rogue applications to undesirably modify part or all of a BIOS.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A device or computer platform that follows the Trusted Computing Group (TCG) specification implements a Core Root of Trust for Measurement (CRTM). In at least some embodiments, part of a platform's Basic Input/Output System (BIOS) (e.g., the boot block) can be used as the CRTM. In alternative embodiments, additional BIOS routines or all of the BIOS can be used as the CRTM. Since a BIOS may undergo revisions during a platform lifecycle, embodiments of the invention enable a platform manufacturer or other authorized entity to securely update the BIOS in a manner that protects the validity of the CRTM.

Figure 1:
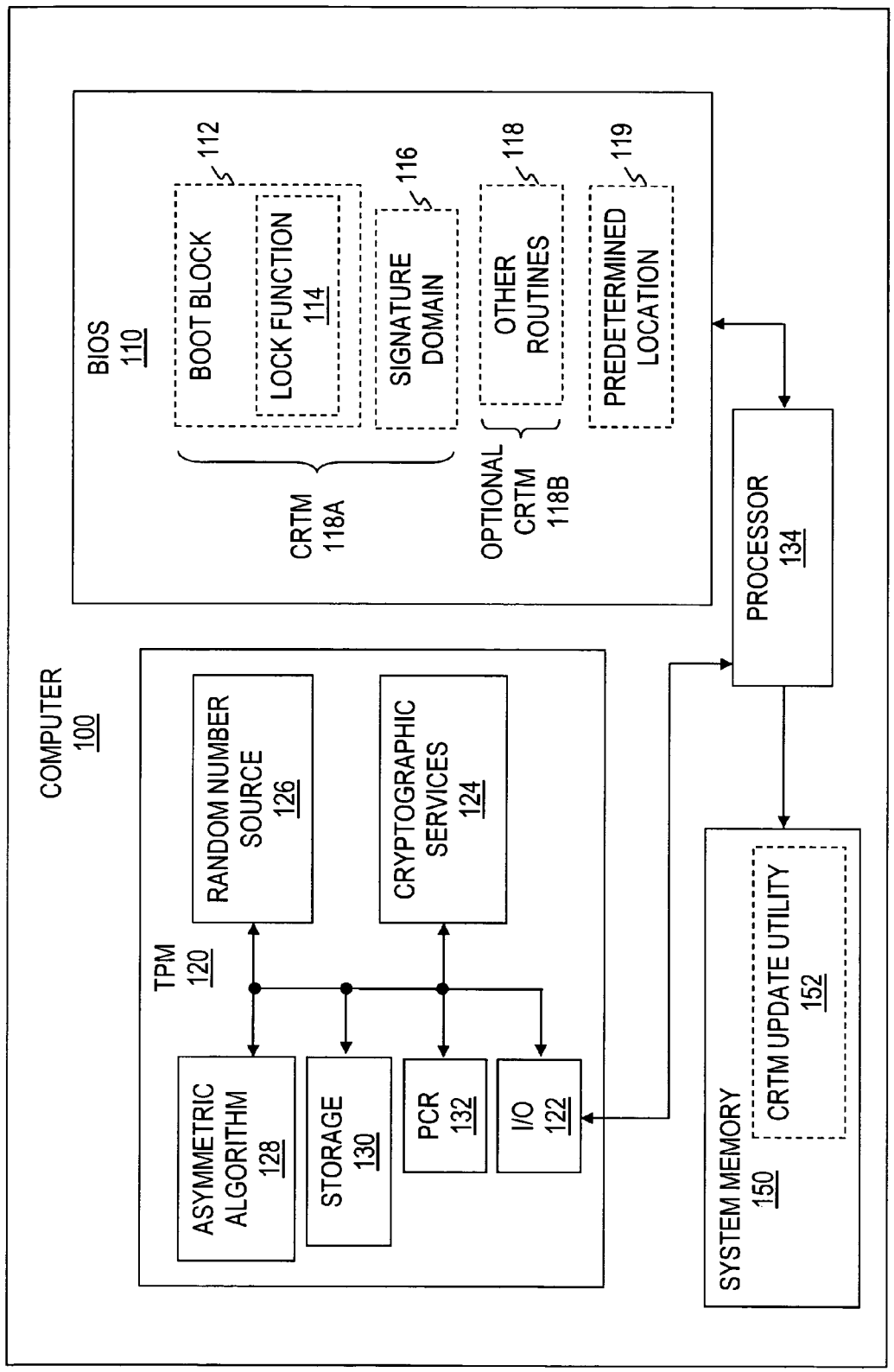
FIG. 1 shows an embodiment of a computer in accordance with the invention.

FIG. 1 shows a computer 100 in accordance with embodiments of the invention. The computer 100 may be, for example, a server, a desktop computer, a laptop computer or a mobile device. In some embodiments, the computer 100 comprises a processor 134 in communication with a Trusted Platform Module (TPM) 120, a BIOS 110 and a system memory 150. The BIOS 110 may be implemented, for example, as part of a chipset (e.g., a "Southbridge") or other module.

The TPM 120 is configured to provide cryptographic functions such as a Rivest Shamir Adleman (RSA) algorithm, a secure hashing (e.g., SHA-1) engine, a hashed message authentication check (HMAC) engine, key generation, random number generation, storage, initialization functions, and management functions. The TPM 120 is implemented using software, firmware and/or hardware.

As shown in FIG. 1, the TPM 120 comprises an input/output (I/O) interface 122 in communication with the processor 134. The I/O interface 122 couples to other TPM components such as cryptographic services 124, a random number source 126, asymmetric algorithms 128, storage 130 and Platform Configuration Registers (PCRs) 132. The cryptographic services 124 support functions such as hashing, certificate signing, and encryption. The random number source 126 generates random numbers for the cryptographic services 124. For example, in some embodiments, the cryptographic services 124 use random numbers to generate encryption keys. The asymmetric algorithms 128 enable the TPM 120 to perform asymmetric key operations. The storage 130 securely stores secrets (e.g., encryption keys or other data) protected by the TPM 120. The PCRs 132 store information about the current state of the computer 100. For example, in some embodiments, the PCRs 132 store individual integrity metrics related to the computer 100 as well as sequences of integrity metrics.

As previously mentioned, a device or computer platform that follows the Trusted Computing Group (TCG) specification implements a Core Root of Trust for Measurement (CRTM). In at least some embodiments, the BIOS 110 of the computer 100 comprises a boot block 112 and a signature domain 116 used as a CRTM 118A. The boot block 112 stores instructions executed during a boot process of the computer 100 and the signature domain 116 stores a signature or hashed signature known to the manufacturer of the computer 100 or some other authorized entity. As shown, the boot block 112 comprises a lock function 114 that enables a CRTM update utility 152 to update the CRTM 118 as will later be described. The CRTM update utility 152 may be stored in the system memory 150 and executed by the processor 134.

The BIOS 110 also comprises other routines 114 that enable other known or future BIOS processes to be performed. These other routines 114 can optionally be used as the CRTM 118B (in addition to the boot block 112 and the signature domain 116). Again, the security of the CRTM 118 is important because CRTM policies and measurement functions establish whether the computer 100 can be trusted.

When the computer 100 resets or boots, the boot block 112 is the first piece of code to be executed. Before the boot block 112 transfers control to another component (e.g., another BIOS component or the computer's operating system), the lock function 114 is executed. The lock function 114 prevents any updates or changes to the CRTM 118 unless an authentication process is successful as will later be described. To lock the CRTM 118 or other portions of BIOS 110, the computer's manufacturer or another authorized entity may specify memory locations (e.g., memory addresses) to be locked by the lock function 114. If only part of the BIOS 110 is used as the CRTM 118, a flash utility can be prepared to update the non-CRTM portions of the BIOS 110 as needed. In at least some embodiments, the flash utility is an application level utility (based on the Open System Interconnection (OSI) model). To ensure the non-CRTM portions are updateable, the computer's manufacturer or other authorized entity should carefully specify which memory locations of BIOS 110 are to be locked by the lock function 114 and which are not. Also, if the CRTM 118 is updated, the memory locations affected by the lock function 114 may need to be updated as well.

If a need arises to update the CRTM 118, the CRTM update utility 152 can be executed, for example, during the computer's run time. During execution, the CRTM update utility 152 writes a password or signature to a predefined location 119 of the BIOS 110 and reboots the computer 100. For example, the CRTM update utility 152 may provide an interface that enables a user to enter the signature based on keyboard commands, mouse commands, a smart card, biometrics, or other means for entering a signature. Once entered, the signature is written to the predefined location 119. During each reboot, the lock function 114 causes the processor 134 to search for a signature in the predetermined location 119. If a signature is not found at the predetermined location 119 or if the signature does not match the value stored in the CRTM's signature domain 116, the lock function 114 locks the CRTM 118 before transferring control to another component of the computer 100.

Alternatively, if a signature is found at the predetermined location 119 and the signature matches the value stored in the CRTM's signature domain 116, the lock function 114 does not lock the CRTM 118 before transferring control to another component of the computer 100. With the CRTM 118 unlocked, the CRTM update utility 152 is able to update the CRTM 118 during the computer's runtime then reboot the computer 100. When the signatures match, the lock function 114 also deletes the signature stored at the predetermined location 154. Therefore, only one boot cycle is available for updating the unlocked CRTM 118. Upon subsequent reboot, the lock function 114 will cause the CRTM 118 to lock unless the correct signature has been written again in the predetermined location 119.

Figure 2:
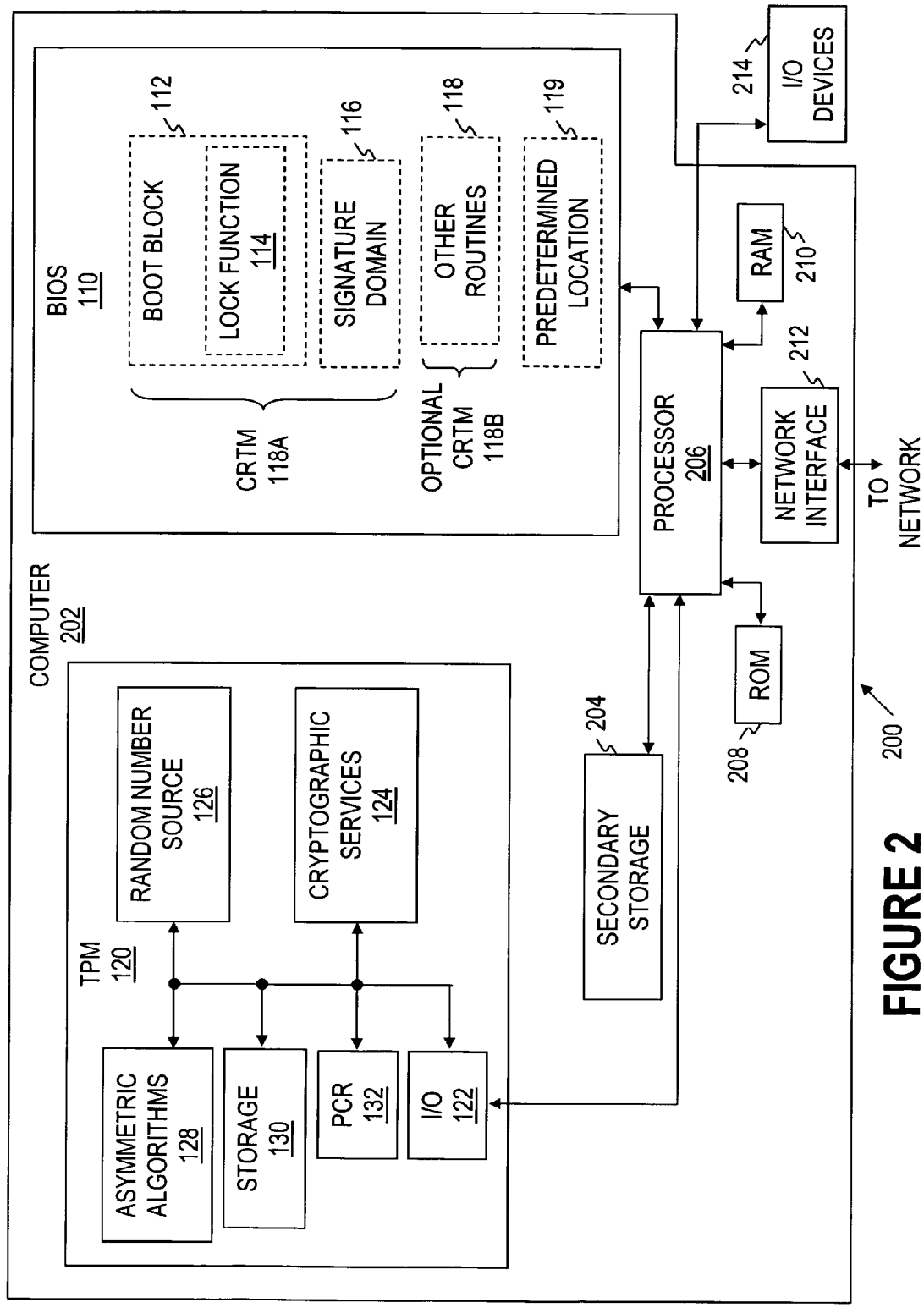
FIG. 2 shows an embodiment of a system in accordance with the invention.

FIG. 2 shows a system 200 in accordance with embodiments of the invention. In FIG. 2, the system 200 comprises a computer 202 having a processor 206 in communication with a Trusted Platform Module (TPM) 120 and a BIOS 110. The functions of the BIOS 110 and the TPM 120 were previously described for FIG. 1 and, for convenience, will not be repeated for FIG. 2. As shown in FIG. 2, the processor 206 is also in communication with other components such as a secondary storage 204, read-only memory (ROM) 208, random access memory (RAM) 210, a network interface 212 and input/output (I/O) devices 214. For example, the I/O devices 214 can be printers, scanners, video monitors, liquid crystal displays (LCDs), touch screen displays, keyboards, keypads, switches, dials, mice, track balls, voice recognizers, card readers, paper tape readers, or other I/O devices.

In at least some embodiments, the secondary storage 204 comprises at least one disk drive or tape drive and is used for non-volatile storage of data and as an over-flow data storage device if the RAM 210 is not large enough to hold all working data. Also, the secondary storage 204 may be used to store programs which are loaded into the RAM 210 when such programs are selected for execution. Thus, the RAM 210 often stores volatile data and/or instructions. The ROM 208 can be used to store instructions and perhaps data which are read during program execution. In some embodiments, the ROM 208 is a non-volatile memory device which has a small memory capacity relative to the larger memory capacity of the secondary storage 204. In FIG. 2, the processor 206 executes instructions, codes, computer programs, or scripts which are accessed from hard disks, floppy disks, optical disks (these various disk based systems may all be considered secondary storage 204), ROM 208, RAM 210, or the network interface 212.

The network interface 212 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network devices. Via the network interface 212, the processor 206 is able to connect to and communicate with the Internet or intranet(s). With such a network connection, it is contemplated that the processor 206 might receive information from the network, or might output information to the network in the course of performing the CRTM update process. For example, the CRTM update utility 152 could be stored remotely in FIG. 2 (e.g., on the network) rather than locally as in FIG. 1.

Information from the network (e.g., a sequence of instructions to be executed using processor 206) may be received and transmitted in the form of a data signal embodied in a carrier wave. Alternatively, the information may be received and transmitted in the form of a data baseband signal. The baseband signal or signal embodied in the carrier wave may propagate in or on the surface of electrical conductors, in coaxial cables, in waveguides, in optical media (e.g., optical fiber), or in the air or free space. The information contained in the baseband signal or signal embedded in the carrier wave may be ordered according to different sequences or protocols, as may be desirable for generating, transmitting or processing the information. The baseband signal or signal embedded in the carrier wave may be generated according to any suitable method currently being used or hereafter developed.

The CRTM 118 of FIG. 2 can be locked/unlocked as previously described for FIG. 1. To protect the CRTM 118 (in either of FIGS. 1 and 2) from unauthorized modification, several security precautions can be implemented. For example, the window during which the CRTM 118 remains unlocked can be reduced or minimized by configuring the CRTM update utility 152 to automatically update the unlocked CRTM 118 once the host computer (i.e., the computer associated with the CRTM 118) has booted. If desired, the CRTM update utility 152 can be configured to start executing before other runtime applications. Alternatively, a user may choose to quickly execute the CRTM update utility 152 once the host computer has booted. After the update is complete, the host computer can be immediately rebooted whereby the CRTM 118 locks itself before passing control to another component.

Also, the signature stored in the predetermined location 119 and the signature domain 116 can be hashed to increase security. If desired, the TPM 120 can be implemented to generate and authenticate a shared secret for use between with the CRTM update utility 152 and the CRTM 118. In other words, a secure session can be established between the CRTM update utility 152 and the CRTM 118 for updating the CRTM 118. Additionally, if signature authentication fails (e.g., someone executed the CRTM update utility 152 but entered an incorrect signature), the CRTM 118 may refuse to pass control of the host computer to another component and/or may provide notification that an invalid attempt to unlock the CRTM 118 occurred.

Figure 3:
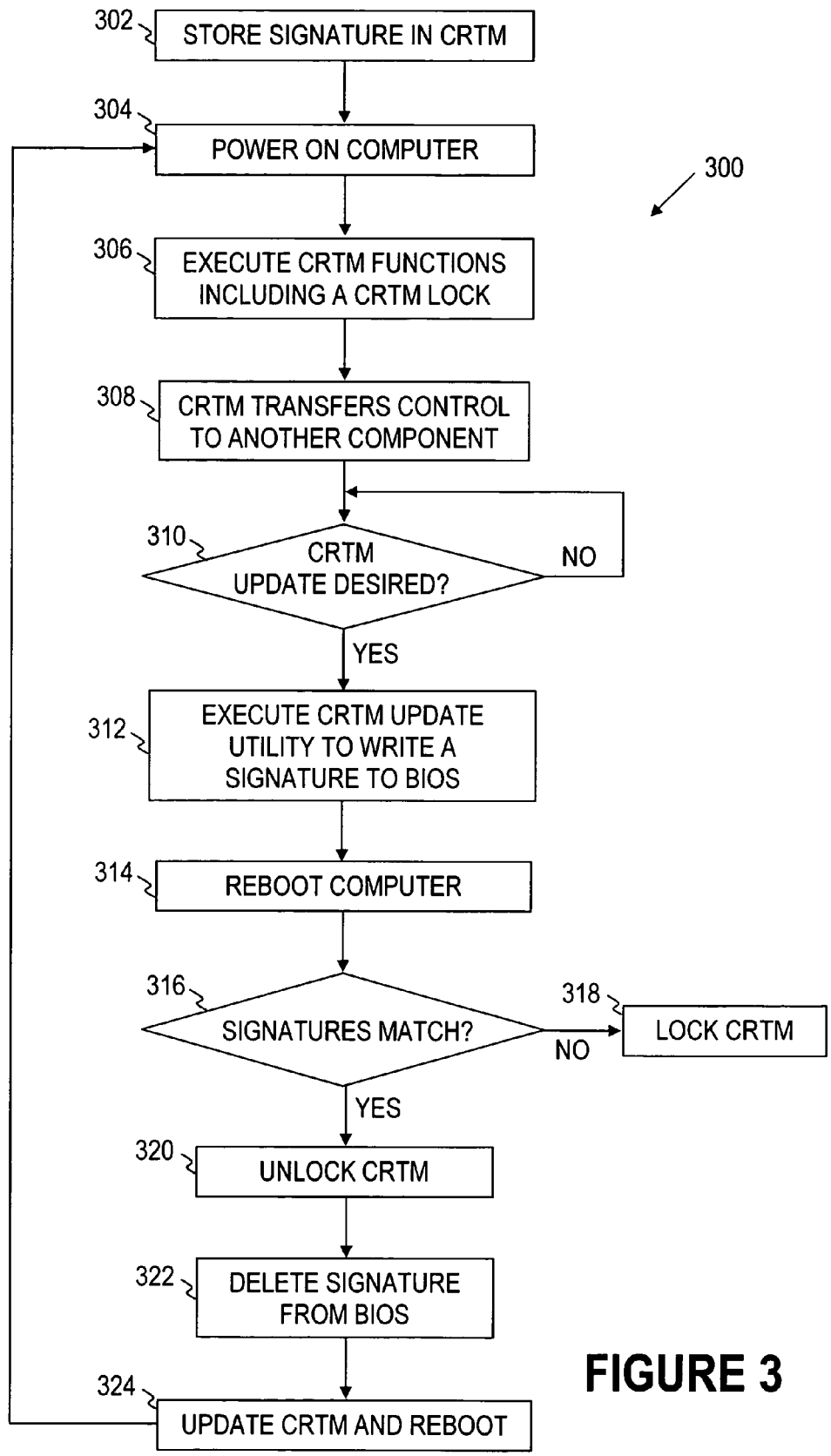
FIG. 3 shows an embodiment of a method in accordance with the invention.

FIG. 3 shows a method 300 in accordance with embodiments of the invention. As shown in FIG. 3, the method 300 comprises storing a signature in a CRTM (block 302) and powering on a computer (block 304). The CRTM can be part or all of the computer's BIOS. At block 306, CRTM functions are executed including a CRTM lock function. The CRTM then transfers control to another component of the computer (block 308). If a CRTM update is desired (determination block 310), a CRTM update utility is executed to write a signature to the computer's BIOS (block 312). The computer is then rebooted (block 314) which causes the CRTM functions to execute again. If the signature stored in the BIOS does not match the signature stored in the CRTM (determination block 316), the CRTM is locked (block 318). Additionally, if there is no signature stored in the BIOS, the CRTM could be locked. In at least some embodiments, the signature authentication is part of the CRTM instruction set executed during a boot process. If the signature stored in the BIOS matches the signature stored in the CRTM (determination block 316), the CRTM is unlocked (block 320) and the signature stored in the BIOS is deleted (block 322). While unlocked, the CRTM is updated and the computer is rebooted (block 324). The method 300 beginning at block 304 is then repeated. Since the signature has been deleted from the BIOS, the CRTM cannot be updated again until a signature is again written to BIOS and authenticated.

Using the method 300 the computer's manufacturer or another authorized entity can update the CRTM (including the signature stored in the CRTM) as needed. To protect the security of the CRTM, a CRTM update utility may automatically update the unlocked CRTM once the computer has booted. Alternatively, a user may quickly execute the CRTM update utility once the computer reaches runtime. After the update is complete, the computer can be immediately rebooted whereby the CRTM locks itself before passing control to another component. To increase security, the signature stored in the CRTM and/or the BIOS can be hashed. Since both signatures are stored in BIOS and the signature authentication occurs before the CRTM passes control to another component, the CRTM update process is highly secure. If desired, a TPM can generate and authenticate a shared secret for use between with a CRTM update utility and the CRTM. The shared secret can be used to establish a secure session between the CRTM update utility and a CRTM for updating the CRTM.

What is claimed is:

1. A computer system, comprising:
   a processor; and
   a Basic Input/Output System (BIOS) module coupled to the processor,
   wherein the BIOS module stores a Core Root of Trust for Measurement (CRTM) that selectively unlocks itself,
   wherein the CRTM comprises a boot block and a signature domain having a predetermined signature,
   wherein, during each boot process of the computer system, a CRTM lock function is executed before the boot block transfers control to an operating system of the computer system,
   wherein the CRTM lock function compares the predetermined signature in the signature domain of the CRTM with a signature in a predetermined location of the BIOS and unlocks the CRTM if the predetermined signature in the signature domain and the signature in the predetermined location match,
   wherein, after the boot process is completed and control is transferred to an operating system of the computer system, and if the CRTM is unlocked, the CRTM is updated.

2. The computer system of claim 1 wherein, before the CRTM lock function compares the predetermined signature in the signature domain of the CRTM with the signature in the predetermined location of the BIOS, the signature is written to the predetermined location of the BIOS and the computer system is rebooted.

3. The computer system of claim 1 wherein, after the CRTM is unlocked, the signature in the predetermined location of the BIOS is deleted.

4. The computer system of claim 1 wherein the predetermined signature in the signature domain of the CRTM is selected by a manufacturer of the computer system.

5. The computer system of claim 1 wherein the predetermined signature in the signature domain of the CRTM is hashed.

6. The computer system of claim 1 further comprising a Trusted Platform Module (TPM) coupled to the processor, wherein the TPM generates a secret used for updating the CRTM.

7. The computer system of claim 1 further comprising a memory coupled to the processor, the memory storing a CRTM update utility that, when executed, updates an unlocked CRTM during runtime of the computer system and then causes the computer system to reboot.

8. The computer system of claim 7 wherein the CRTM update utility is stored and accessed on a remote computer.

9. The computer system of claim 7 wherein the CRTM update utility, when executed, enables the signature to be written to the predetermined location of the BIOS and wherein the CRTM attempts to authenticate the signature during a subsequent boot cycle.

10. The computer system of claim 9 wherein, if authentication of the signature fails, control is not transferred to another component of the computer system.

11. The computer system of claim 9 wherein, if the CRTM successfully authenticates the signature, the CRTM is unlocked for a single boot cycle.

12. The computer system of claim 9 wherein, if the CRTM successfully authenticates the signature, the signature is deleted from the BIOS.

13. A method for a computer system, comprising:
   configuring at least part of a Basic Input/Output System (BIOS) to provide Core Root of Trust for Measurement (CRTM) functions;
   during each boot process of the computer system, and before transferring control to an operating system of the computer system, unlocking the CRTM if a predetermined signature in a signature domain of the CRTM and a signature in a predetermined location of the BIOS match; and after the boot process is completed and control is transferred to the operating system of the computer, updating the CRTM during runtime if the CRTM is unlocked.

14. The method of claim 13 further comprising establishing a secure session between the CRTM and a CRTM update utility before unlocking the CRTM.

15. The method of claim 13 further comprising writing the signature to the predetermined location of the BIOS and rebooting the computer system before comparing the predetermined signature in the signature domain of the CRTM and the signature in the predetermined location of the BIOS.

16. The method of claim 13 further comprising deleting the signature in the predetermined location of the BIOS if the predetermined signature in the signature domain of the CRTM and the signature in the predetermined location of the BIOS match.

17. The method of claim 13 wherein unlocking the CRTM comprises unlocking the CRTM for a single boot cycle.

18. The method of claim 13 wherein, if the CRTM is unlocked, executing a CRTM update utility before other runtime applications are executed to update the CRTM and reboot the computer system.

19. The method of claim 13 further comprising:
refusing to transfer control to another component of the computer system if the predetermined signature in the signature domain of the CRTM and the signature in the predetermined location of the BIOS do not match.

20. A Basic Input/Output System (BIOS) stored on a non-transitory computer readable medium of a computer, the BIOS comprising:
a boot block that performs Core Root of Trust for Measurement (CRTM) functions;
a CRTM signature domain of the BIOS that stores a predetermined signature associated with the CRTM; and
a predetermined location of the BIOS that receives a signature from a CRTM update utility,
wherein, before the boot block transfers control to an operating system of the computer, a CRTM lock function is executed,
wherein the CRTM lock function includes a signature authentication performed within the BIOS using the predetermined signature in the CRTM signature domain of the BIOS and the signature in the predetermined location of the BIOS,
wherein, after a boot process of the computer is completed and control is transferred to the operating system of the computer, and if the signature authentication is successful, the CRTM is unlocked and updated.

21. The BIOS of claim 20 wherein, if the signature authentication is unsuccessful, control is not transferred to another component of the computer.

* * * * *